(12) United States Patent
Eulette (10) Patent No.: US 12,460,700 B2
(45) Date of Patent: Nov. 4, 2025

(54) LOCKING TURNBUCKLE (71) Applicant: Precision Tech Manufacturing, LLC, Miami, FL (US)

(72) Inventor: Jason A. Eulette, Miami, FL (US)

(73) Assignee: Precision Tech Manufacturing, LLC, Miami, FL (US)

( * ) Notice: Subject to any disclaimer, the term of this patent is extended or adjusted under 35 U.S.C. 154(b) by 291 days.

(21) Appl. No.: 18/360,057

(22) Filed: Jul. 27, 2023

(65) Prior Publication Data
US 2025/0035189 A1    Jan. 30, 2025

(51) Int. Cl.
*F16G 11/12* (2006.01)

(52) U.S. Cl.
CPC ..................... *F16G 11/12* (2013.01)

(58) Field of Classification Search
CPC .................. F16G 11/12; F16B 7/06
USPC ........................................... 403/46
See application file for complete search history.

(56) References Cited

U.S. PATENT DOCUMENTS

| | | | | | |
|---|---|---|---|---|---|
| 1,245,095 A | * | 10/1917 | Flood | ............... | F16G 11/12 403/46 |
| 1,411,279 A | * | 4/1922 | Jaynes | ............... | F16G 11/12 403/46 |
| 1,473,677 A | * | 11/1923 | Hoffmann | ............... | F16G 11/12 403/44 |
| 2,367,740 A | * | 1/1945 | Schubert | ............... | F16G 11/12 403/46 |
| 2,550,018 A | * | 4/1951 | Weiland | ............... | F16G 11/12 24/71 CT |
| 2,580,482 A | * | 1/1952 | Stukenborg | ............... | F16G 11/12 411/218 |
| 2,790,658 A | * | 4/1957 | Robinson | ............... | F16G 11/12 403/44 |
| 2,878,044 A | * | 3/1959 | Estes | ............... | F16G 11/12 403/46 |
| 2,913,267 A | * | 11/1959 | Johnson, Jr. | ............... | F16G 11/12 403/46 |
| 3,806,265 A | * | 4/1974 | Hattan | ............... | F16G 11/12 403/46 |
| 3,851,978 A | * | 12/1974 | Kuipers | ............... | F16B 7/06 403/45 |
| 4,025,207 A | * | 5/1977 | Johnson, Jr. | ............... | F16G 11/12 403/103 |

(Continued)

*Primary Examiner* — Jeffrey O'Brien
(74) *Attorney, Agent, or Firm* — David Colls; Berger Singerman LLP (57) ABSTRACT

A turnbuckle comprising a frame delimiting an internal space and a cover pivotably attached to the frame. The frame including several cutout-outs giving access to the internal space of the frame, granting access to locking nut disposable therein. The cover includes one or more elongated members on an internal top cover surface that are configured to protrude through one or more slot openings on the frame when the cover is in a covering configuration. The cover is movable between a covering configuration and an uncovering configuration. In a covering configuration, the cover contacts the locking nut in at least three contact points, preventing rotational movement of the locking nut. In alternative embodiments, the cover may comprise a split cover, each independently attachable to the frame or a cover having a pair of aligned apertures configured to receive a pad lock to secure the cover in the covering configuration.

16 Claims, 6 Drawing Sheets

(56) References Cited

U.S. PATENT DOCUMENTS

| | | | | |
|---|---|---|---|---|
| 4,111,568 | A * | 9/1978 | Wing | F16B 7/06 |
| | | | | 403/44 |
| 4,778,194 | A * | 10/1988 | Koch | F16C 7/06 |
| | | | | 403/46 |
| 5,156,482 | A * | 10/1992 | Owings | F16G 11/12 |
| | | | | 403/46 |
| 5,713,686 | A * | 2/1998 | Maughan | F16B 7/06 |
| | | | | 403/46 |
| 5,765,957 | A * | 6/1998 | Connell | F16C 7/06 |
| | | | | 403/44 |
| 5,782,078 | A * | 7/1998 | Brantley | F16B 7/06 |
| | | | | 60/797 |
| 7,048,071 | B1 * | 5/2006 | Huenink | A01B 59/004 |
| | | | | 403/46 |
| 8,353,639 | B2 * | 1/2013 | Kelly | F16B 33/002 |
| | | | | 403/46 |
| 9,970,466 | B1 * | 5/2018 | Randolph | F16B 7/06 |
| D865,490 | S * | 11/2019 | Randolph | D8/382 |
| 2022/0290737 | A1 * | 9/2022 | Squire | F16G 11/12 |

* cited by examiner

LOCKING TURNBUCKLE

FIELD OF THE INVENTION

The present invention relates generally to tensioners, and more particularly, to an innovate locking turnbuckle.

BACKGROUND OF THE INVENTION

A turnbuckle is a rigging device that is used to adjust tension and reduce slack in a rope, cable, or similar tensioning assembly. Turnbuckles are diverse in nature and are used in a variety of applications across multiple disciplines. For instance, turnbuckles can be used in fence or perimeter cabling, recreational rigging (e.g., ziplining), or in the marina industry.

Current turnbuckles devices, however, fall victim to similar issues—the tightening mechanism used to maintain tension begins to fail, and the tension held by the turnbuckles is gradually lessened until complete tension failure occurs. Tension failure occurs in most cases when the locking nut threaded onto the threaded shaft of the turnbuckle begins to unwind and come loose. In alternative designs where the lock nut is locked tight to the threaded shaft, i.e., glued to the shaft, the turnbuckle begins to fail when the shaft and the lock nut rotate together, and thus, affecting the tension held by the turnbuckle.

The loosening of the locking nut can mostly occur due to vibration, wear and tear, or improper tightening during installation of the turnbuckle coupled or isolated with another aggravating factor, e.g., vibrations. As a result, many have tried to provide solutions to the ongoing problem by adding locking wires, using locking jam nuts, or, in certain situations, adhesives, locking the locking nut to the threaded shaft. These alternatives, however, have not lessened the problem because they bring forth several problems of their own. For example, locking wires are difficult to maneuver and can easily cause injuries, e.g., perforations or cuts to a user's skin when handling the sharp, thin wire; using locking jam nuts is a cumbersome and difficult to execute if the threaded shaft is not long enough to support the locking jam nuts; and locked, i.e., adhered, locking nuts with turnbuckles are not effective. For instance, current turnbuckle designs that work with adhered locking nuts include casings. The design of the turnbuckle and casing, however, are defective because the covers are made of weak, thin metals. Under torsion, the lock nut along with the threaded shaft over time begin to deform the casing encasing the locking nut, causing the side walls of the casing to protrude outwardly. This failure in the sidewalls of the casing causes the turnbuckle's purpose, as a whole, to fail because the locking nut and shaft are free to rotate and lessen the tension held by the turnbuckle. Accordingly, rather than the foregoing examples providing a solution to the ongoing problem, these alternatives instead exchange one problem for another.

Accordingly, there is an established need that as of yet has not been met for a new type of locking turnbuckle.

SUMMARY OF THE INVENTION

Introducing a first embodiment of the invention, the present invention consists of a turnbuckle, comprising a frame delimiting an internal space and a cover pivotably attached to the frame. The frame including several cutouts giving access to the internal space of the frame, granting access to locking nut disposable therein. The cover includes one or more elongated members on an internal top cover surface that are configured to protrude through one or more slot openings on the frame when the cover is in a covering configuration. The cover is movable between a covering configuration and an uncovering configuration. In a covering configuration, the cover contacts the locking nut in at least three contact points, preventing rotational movement of the locking nut. In alternative embodiments, the cover may comprise a split cover, each independently attachable to the frame or a cover having a pair of aligned apertures configured to receive a pad lock to secure the cover in the covering configuration. The turnbuckle of claim 1, wherein the frame includes a mid-portion wall dividing the internal space.

In another aspect, the frame may include a mid-portion wall dividing the internal space into two chambers. The mid-portion wall is also configured to provide support to the cover when the cover is in the covering configuration.

In another aspect, the cover may include one or more indents configured to provide a gripping surface suitable for gripping purposes when moving the cover from the covering configuration to the uncovering configuration.

In another aspect, the frame may include a front end and a rear end having axially aligned apertures configured to receive a threaded shaft therethrough. The internal space of the frame is sized and otherwise configured to retain a portion of the threaded shaft and the locking nut therein and allow for the shaft and locking nut to rotate when the cover is in the uncovering configuration. When the cover is in the covering configuration, however, the locking nut and shaft are unable to rotate.

In another aspect, when the cover is in the covering configuration, the locking nut is contacting at least three contact surfaces on the cover. The at least three contact surfaces may include the elongated member of the cover protruding through the slot openings on the frame and the opposing side walls of the cover.

In yet another aspect, the cover may comprise at least two section covers that are pivotably attachable to the frame, where each respective section cover of the two section covers is attached to a respective end of the frame and configured to independently pivot from the another. In an alternative embodiment of the cover, the cover includes a pair of axially aligned apertures configured to receive therethrough a locking mechanism, such as a shackle portion of a pad lock, to secure the cover in a covering configuration.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The phrase "and/or," as used herein, should be understood to mean "either or both" of the elements so joined, i.e., elements that are conjunctively presented in some cases and disjunctively presented in other cases.

As used herein, an element or step recited in the singular and proceeded with the word "a" or "an" should be understood as not excluding plural elements or steps, unless such exclusion is explicitly recited.

Figure 1:
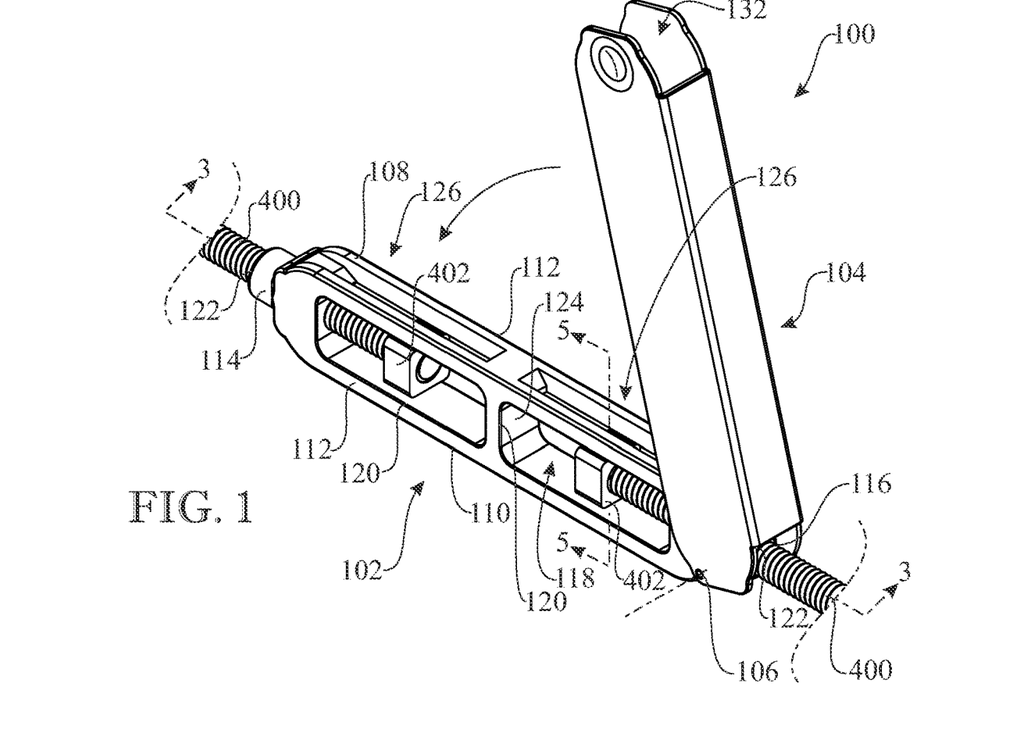
FIG. 1 presents a front perspective view of a turnbuckle with a cover unit pivotably attached to a side end of the frame body of the device in an unsecured configuration.
Figure 2:
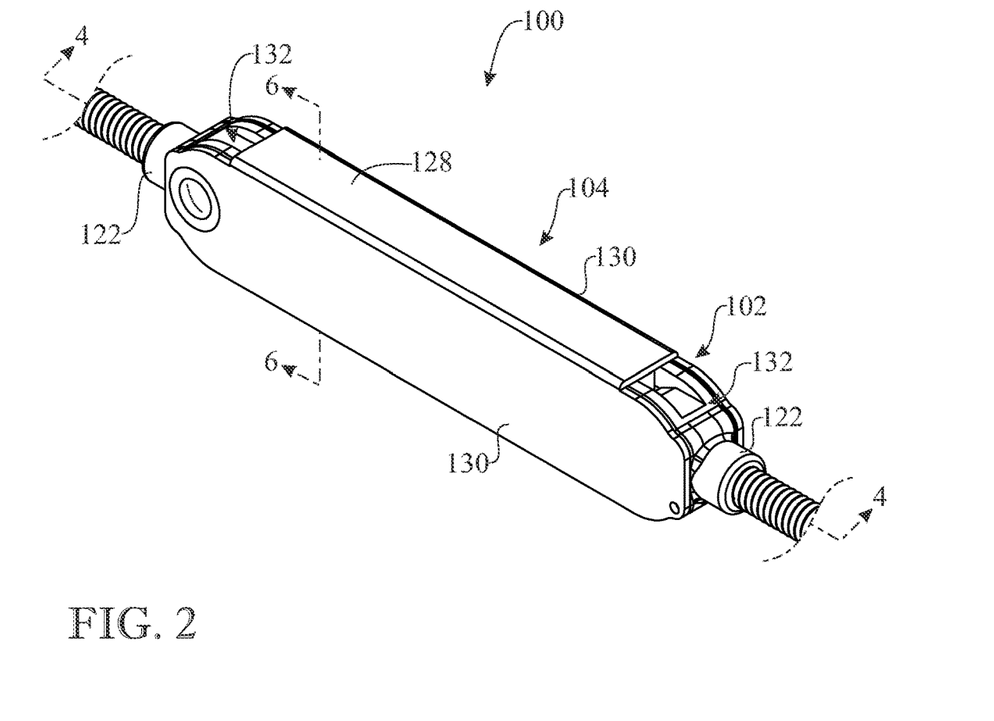
FIG. 2 presents a front perspective view of the turnbuckle with the cover in a secured configuration.

Referring initially to FIGS. 1 and 2, there is generally shown a turnbuckle 100 in accordance with the present invention. The turnbuckle 100 in one exemplary embodiment comprises a main body frame 102 ("frame") and a cover unit 104 ("cover"). As shown in FIG. 1, the cover unit 104 of the turnbuckle 100 is pivotably attached with the use of a pivot pin 106 to the frame 102. The cover 104, when pivotably attached, is capable of pivoting from a frame covering configuration, as seen in FIG. 2, and a frame uncovering configuration, as seen in FIG. 1. In alternative embodiments, the cover unit 104 may be removably press-fitted onto the frame 102 or the cover unit 104 may be slidable coupled to the frame 102. Accordingly, one will understand that the manner in which the unit cover 104 is attached to the frame 102 of the turnbuckle 100 may vary, and, thus, the foregoing should be understood to be exemplary and not limiting.

The frame 102 of the turnbuckle 100 comprises a frame-like structure that includes a top end 108, a bottom end 110, opposing side ends 112, a front end 114, and a rear end 116. As seen best in FIG. 2, the opposing side ends 112 and top and bottom ends 108, 110 include side walls extending from the front end 114 and rear end 116, delimiting an internal space 118. The internal space 118 is sized and otherwise configured to receive therein a portion of a threaded shaft 400 and locking nut 402 attached to the distal end of the shaft 404. The frame 102 of the turnbuckle also includes one or more cutouts 120 that allow access to the internal space 118 of the frame 102. The cutouts, in one exemplary form, are provided about the opposing side ends 112 of the frame 102, and are rectangulary shaped with rounded edges. Moreover, the frame 102 of the turnbuckle, in some exemplary embodiments, at the mid-portion, i.e., about half the distance between the front end 114 and the rear end 116 of the frame, also includes an erected side wall 124 within the internal space 118, dividing the internal space 118 of the frame into at least two separate compartments. At the front end 114 and the rear end 116 of the frame 102, the turnbuckle includes an aperture 122 that are axially aligned with one another. The axially aligned apertures 122 are sized and configured to receiving therethrough a portion of a threaded shaft 400. In the exemplary embodiment where the frame 102 of the turnbuckle 100 includes a side wall 124 inside its internal space 118, the frame receives a corresponding shaft 400 and locking nut 402 into a respective chamber formed by the inclusion of the side wall 124, thereby preventing the opposing shafts and locking nuts from interacting with one another. In this particular configuration, the side wall 124 also gives the frame 102 added structural integrity as opposed to an exemplary embodiment devoid of the side wall 124. This is best seen in FIG. 4.

With continued reference to FIG. 1, the frame 102 of the turnbuckle includes one or more slot openings 126. The slot openings 126, in one exemplary form, are provided on the top end 108 of the frame 102, rear end 110 of the frame 102, or on both top and bottom ends. In some examples, the slot openings 126 may include a single, continuous slot opening or as illustrated in FIG. 2, at least two slot openings 126 on the top end 108 with the slot openings 126 interrupted by the sidewall 124 provided in the interior space 118 of the frame 102. The slot openings 126 are sized and configured to receive therethrough elongated members disposed on the cover unit 104 of the turnbuckle 100, but more on that later. In some exemplary embodiments, the turnbuckle 100 may constructed from a single block and machined to specification, drop forged, or printed. The turnbuckle may be made out of any metal, metal alloys, composites or the like.

Figure 3:
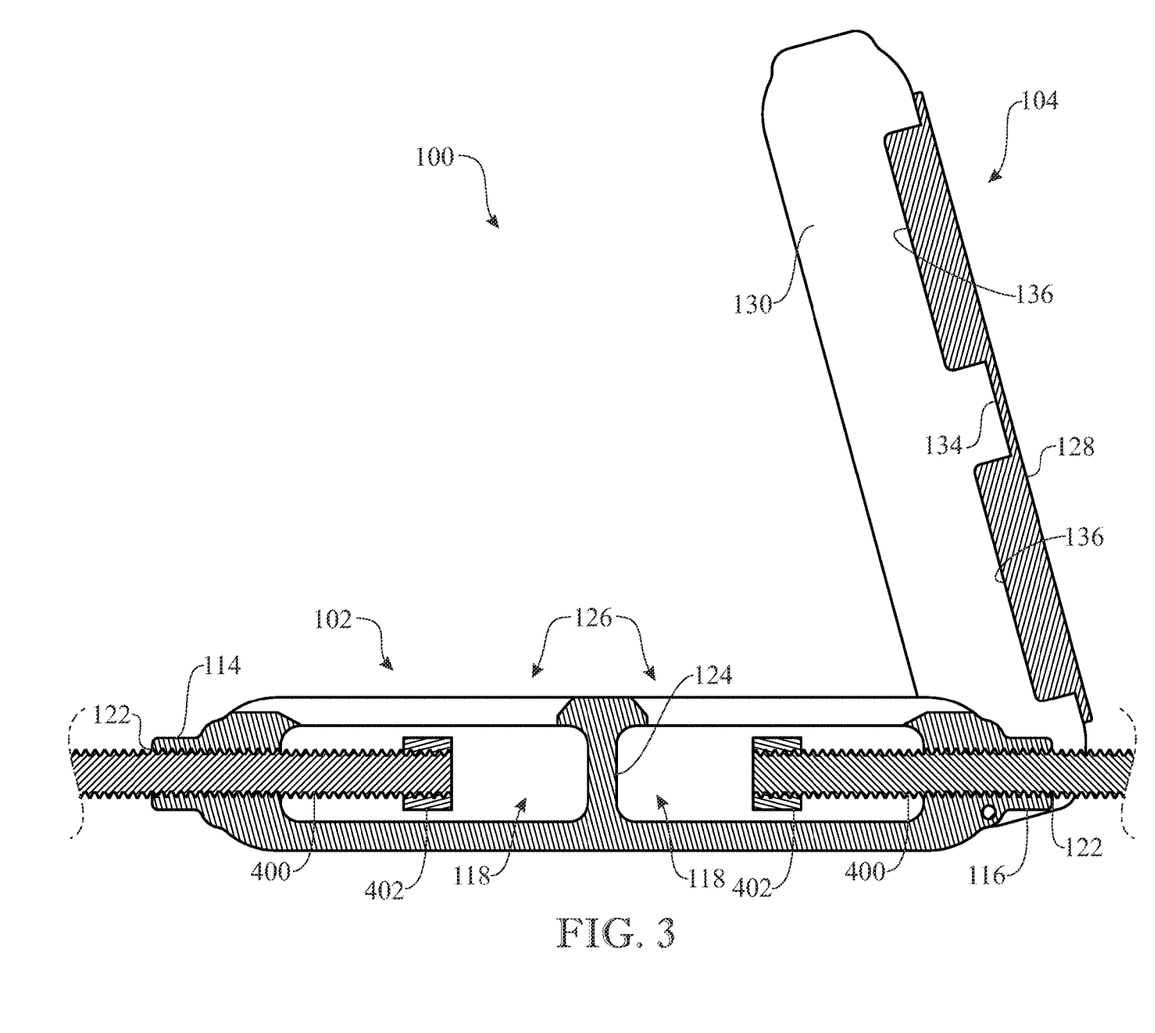
FIG. 3 presents a right-side cross-sectional view of the turnbuckle taken across sectional line 3-3, shown in FIG. 1.
Figure 4:
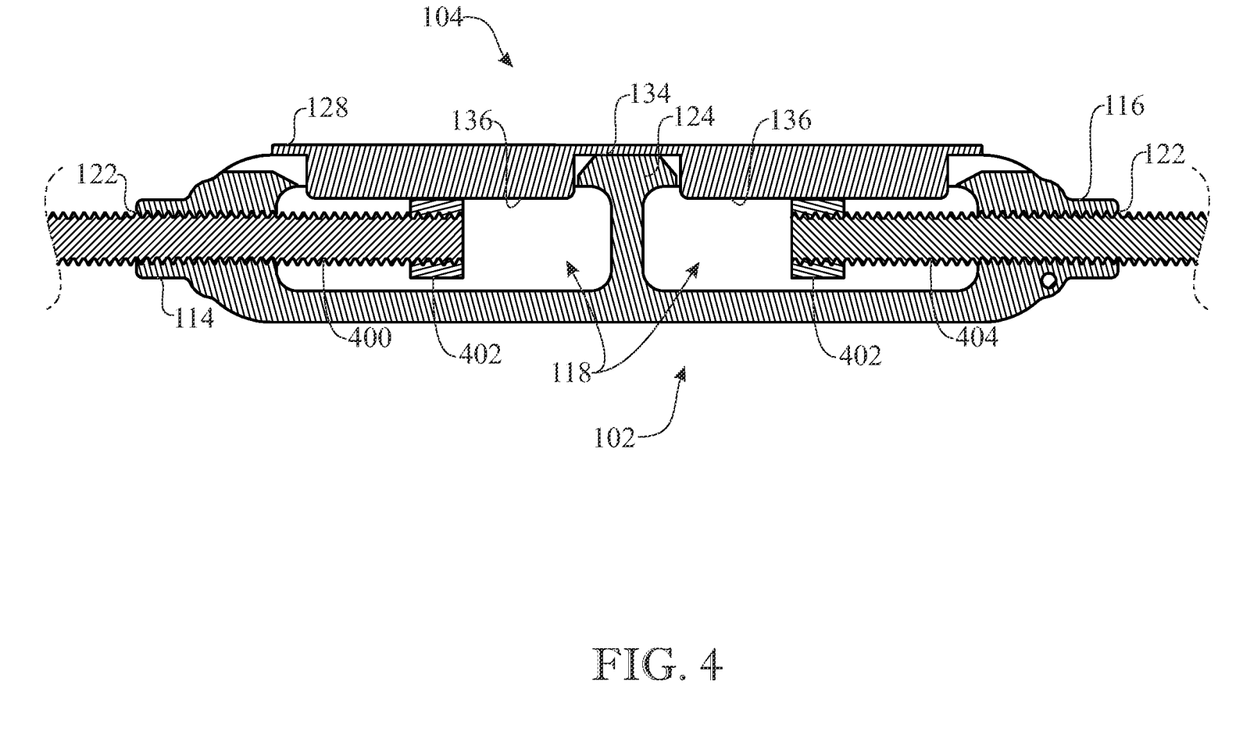
FIG. 4 presents a right-side cross-sectional view of the turnbuckle taken across sectional line 4-4, shown in FIG. 2.

With reference now to FIGS. 1 through 6, the cover unit 104 attachable to the frame comprises a top wall 128, opposing side walls 130 extending downwardly from the top wall, and open ends 132. As is best seen in FIG. 1, the shape of the cover unit 104 matches the shape of the frame 102, such that when the cover unit 104 is in the covering configuration (FIG. 2), the frame 102 is substantially covered—and in some cases entirely covered with the exception of the frame's front and rear end—by the cover unit 104. As seen in FIGS. 3 and 4, the cover unit 104 of the turnbuckle 100 also includes an elongated member 136 projecting from an interior top wall surface 134 of the top wall 128 of the cover. The elongated member 136, in some exemplary embodiments, may extend longitudinally along the longitudinal axis of the cover 104. In alternative embodiments, like the one shown in the accompanying figures, the elongated member 136 is provided in at least two portions. It is contemplated that the number of elongated member(s) 136 match the number of slot openings 126 provided in the frame 102 of the turnbuckle 100.

Figure 5:
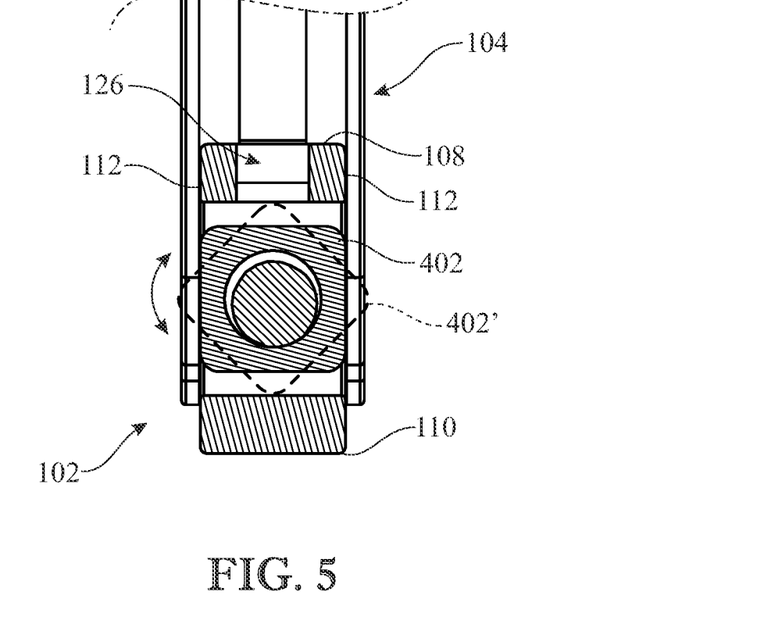
FIG. 5 presents a front elevation cross-sectional view of the turnbuckle taken across sectional line 5-5, shown in FIG. 1.
Figure 6:
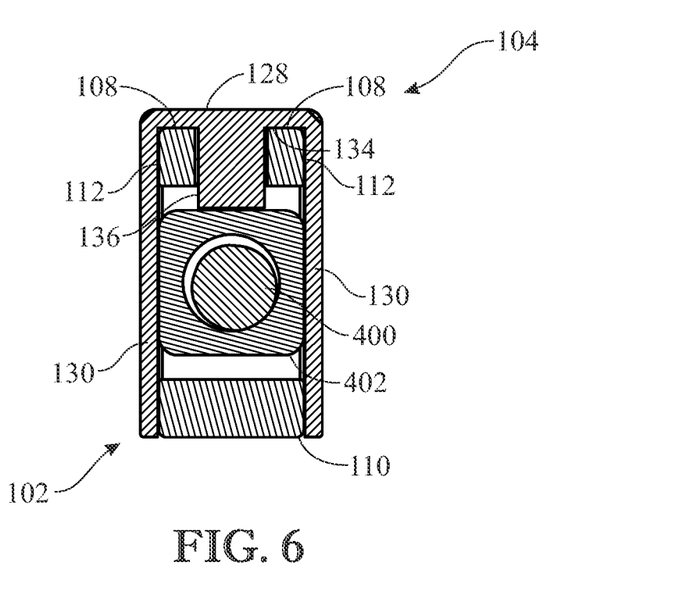
FIG. 6 presents a front elevation cross-sectional view of the turnbuckle taken across sectional line 6-6, shown in FIG. 2.

As iterated above, the cover unit 104 of the turnbuckle 100 is configured to be positioned in at least two distinct configurations when pivotally attached to the frame 102—that specifically being in a frame covering configuration and a frame uncovering configuration. When the cover unit 104 is in an uncovering configuration, as seen in FIGS. 1 and 3, the locking nut 402 and the threaded shaft 400 are able to rotate freely when a force is applied to it. This is best seen in FIG. 5, which shows the cover unit 104 in an uncovering configuration allowing the locking nut 402 and shaft 400 to rotate from a first position to a secondary position 402', as is necessary. The cut outs 120 on the frame 102, allow access to the locking nut and shaft for adjusting the tension provided by the turnbuckle. After the desired tension is obtained, however, the cover unit 104 is moved into its covering configuration, as seen in FIGS. 2, 4 and 6. In this configuration, the elongated members 136 projecting from the interior top wall surface 134 of the top wall 128 of the cover 104 engage and protrude through the opening slots 126 of the frame 102.

Perhaps as best illustrated in FIGS. 4 and 6, the cover unit 104 is supported by the side wall 124 provided within the interior space 118 of the frame 102. The support side wall 124 prevents the top wall 128 of the cover unit 104 from caving or malforming, i.e., failing during use. As is best illustrated in FIG. 6, the elongated members 136 projecting from the cover unit 104 also play a vital role in the prevention of unwanted rotation of the locking nut 402 and shaft 400. For instance, when the cover unit 104 is in a closed configuration (FIG. 2), the cover unit 104 makes contact with the locking nut 403 in at least three contact points—the opposing side walls 130 and the elongated members 136 of the cover unit 104—with the outer surfaces of the locking nut 402. This three-point contact feature provided by the turnbuckle 100 on the locking nut prevents the locking nut from rotating, providing a novel and substantial improvement on existing turnbuckles. The three contact points applied on the locking nut 402 by the turnbuckle creates sufficient frictional force to maintain the locking nut and shaft static, even when experiencing external rotational forces that would otherwise deform existing products. In some exemplary embodiments, at least one contact point provided by the elongated member 136 of the cover unit 104 is sufficient to create sufficient frictional force to maintain the locking nut and shaft static. Put differently, in an exemplary embodiment where the cover is devoid of the opposing side walls 130 and only includes the top wall 128 with the elongated member 136, the elongated member 136 protruding through the slot openings 126 and making contact with the nut, is sufficient to prevent the nut and shaft from rotating.

Figure 7:
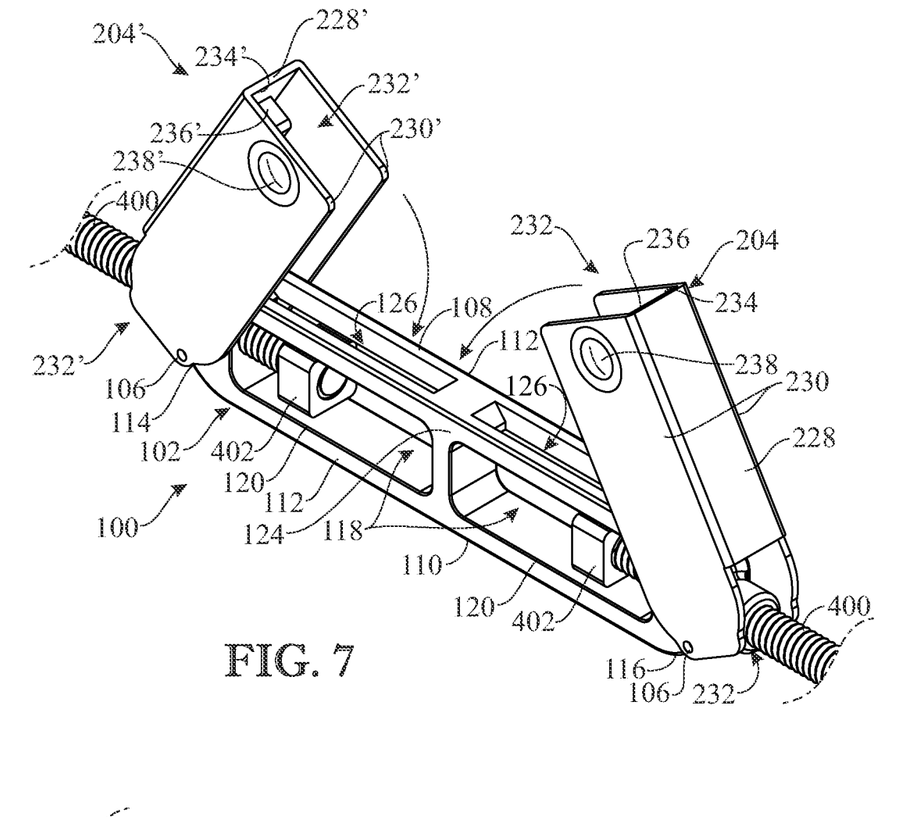
FIGS. 7 and 8 present a front perspective view of an alternative embodiment of the turnbuckle having a different cover unit than the one shown in FIG. 1, illustrating the cover in an open and closed configuration.
Figure 8:
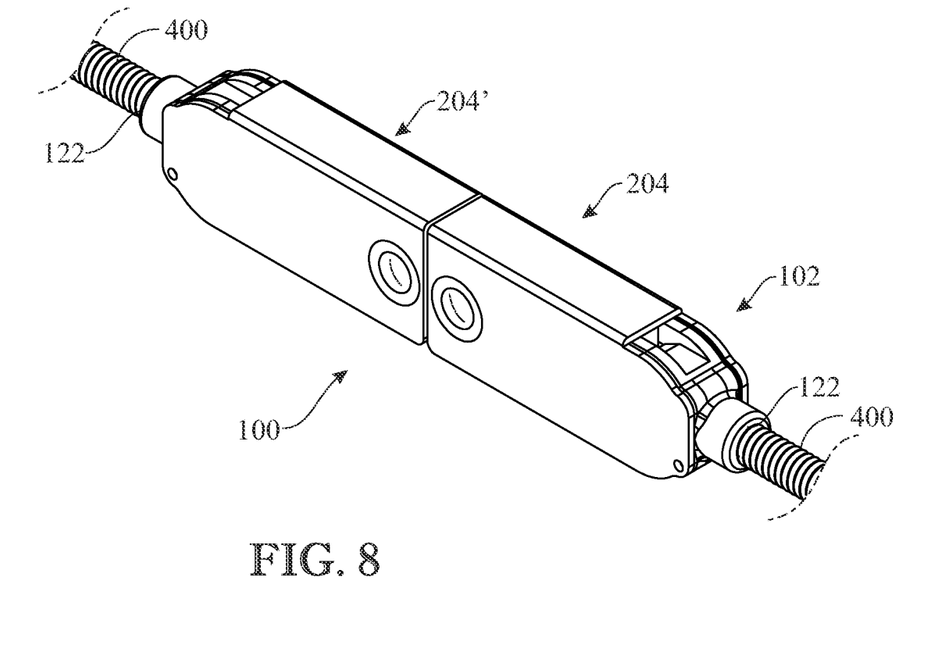

With reference now to FIGS. 7 and 8, a turnbuckle 100 with a substantially identical frame 102 and an alternative cover unit 200 configuration is generally shown. As described in greater detail above, the frame-like structure 102 includes a top end 108, a bottom end 110, opposing side ends 112, a front end 114, and a rear end 116. The opposing side ends 112 and top and bottom ends 108, 110 include side walls extending from the front end 114 and rear end 116, delimiting an internal space 118. The frame 102 of the turnbuckle also includes one or more cutouts 120 that allow access to the internal space 118 of the frame 102, and at the mid-portion having an erected side wall 124 within the internal space 118, dividing the internal space 118 of the frame into at least two separate compartments. At the front end 114 and the rear end 116 of the frame 102, the turnbuckle includes an aperture that are axially aligned with one another. The axially aligned apertures are sized and configured to receiving therethrough a portion of a threaded shaft 400 and retain a locking nut 402.

The frame 102 of the turnbuckle includes one or more slot openings 126. The slot openings 126, in one exemplary form, are provided on the top end 108 of the frame 102, rear end 110 of the frame 102, or on both top and bottom ends. In some examples, the slot openings 126 may include a single, continuous slot opening or a plurality of slot openings 126 on the top end 108. The slot openings 126 are sized and configured to receive therethrough elongated members disposed on the cover unit 204 of the turnbuckle 100. Unlike the cover unit 104, the cover unit 204 shown in FIGS. 7 and 8 comprise of at least two segments 204, 204' that are substantially identical.

Each cover unit 204, 204' of the turnbuckle 100 comprises a top wall 228, 228', opposing side walls 230, 230' extending downwardly from the top wall, and open ends 232, 232', and is pivotally attachable to an end of the frame 102 via a pivot pin 106. Each cover unit 204, 204' is capable of pivoting independently from the other. The shape of the cover units 204, 204', akin to cover 104 in FIG. 1, match the shape of the frame 102 in a frame covering configuration (FIG. 8), such that when the cover unit 204, 204' is in the covering configuration, the frame 102 is substantially covered. The cover unit 204, 204' of the turnbuckle 100 also includes at least one elongated member 236, 236' projecting from an interior top wall surface 234, 234' of the top wall 228 of each respective cover 204, 204'. The elongated member 236, 236' may extend longitudinally along the longitudinal axis of the cover 204, 204'. The cover unit 204, 204' may further include a gripping surface 238, 238', such as an indentation, to provide a more grippable surface on the cover unit to move the cover unit(s) from the covering configuration and uncovering configuration. As described in greater detail above, the cover unit 204, 204' of the instant embodiment also provides a three-point contact feature applied to the locking nut 402 when the cover units 204, 204' are in a covering configuration, thus preventing the locking nut from rotating.

Figure 9:
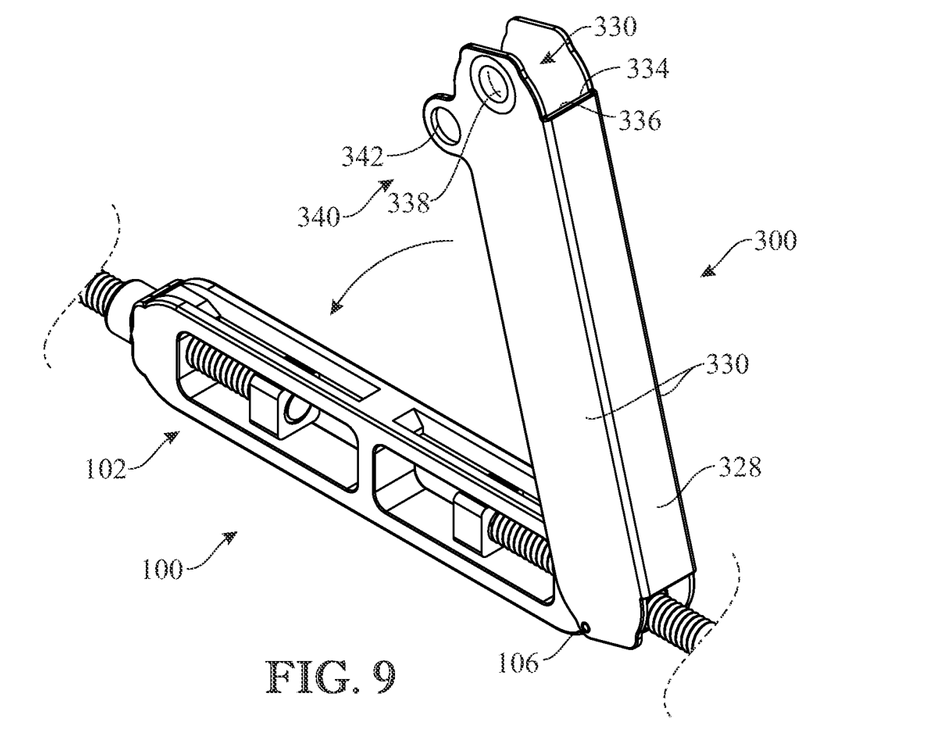
FIGS. 9 and 10 present a front perspective view of an alternative embodiment of the turnbuckle having a pair of axially aligned locking apertures disposed on an end of the cover unit for selectively receiving a locking mechanism, such as the shackle of a padlock, to secure the cover to the main body of the turnbuckle.
Figure 10:
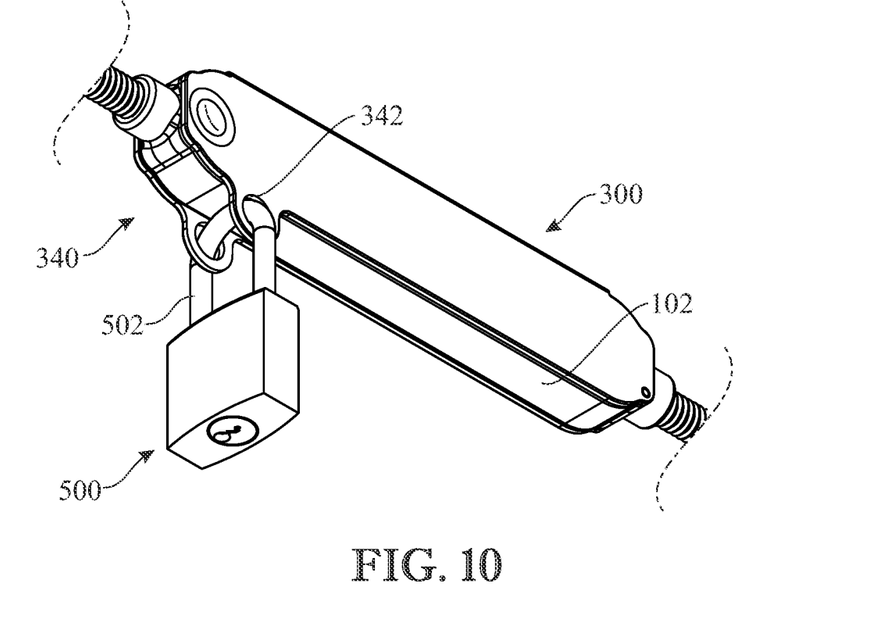

Turning now to FIGS. 9 and 10, another exemplary embodiment of the turnbuckle 100 is shown with still another exemplary cover unit 300. Because the frame 102 of the turnbuckle 100 is the same as described herein above, for the sake of brevity, the frame is not described in detail herein below. Instead, the focus is on cover unit 300. The cover unit 300 of the instant exemplary embodiment includes a top wall 328, opposing side walls 330 extending downwardly from the top wall, and open ends 323. The cover unit 330 is pivotally attached to an end of the frame 102 via a pivot pin 106. As discussed above, however, the attachment of the cover unit to the frame may vary (e.g., the cover may be slidably engaged with the frame or removably press-fitted to the frame, etc). The cover unit 304 of the turnbuckle 100 also includes an elongated member 336 projecting from an interior top wall surface 334 of the top wall 328 of the cover unit 304. The elongated member 304, as cover unit 104, may extend longitudinally along the longitudinal axis of the cover 304. The unit cover 304 may further include a gripping surface 338, such as an indentation, to provide a more grippable surface on the cover unit too. Unlike the cover units described above, the cover unit 300 may include a pair of securing arms 340 that have axially-aligned apertures 342 sized and configured to receive a locking mechanism therethrough for securing the cover unit 304 in the frame covering configuration. For example, as shown in FIG. 10, the cover unit 340 may receive the shackle portion 502 of a padlock 500 to secure the cover unit 304 in the covering configuration as an added security feature. The arms 340 of the cover unit 304 may be provided anywhere along the length of the cover unit. However, as exemplary shown, the arms are best placed proximate an open end of the cover unit, opposite where the cover unit is pivotably attached to the frame.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A turnbuckle, comprising:
   a first threaded shaft having a first locking nut;
   a frame delimiting an internal space and having at least two opposing cutouts giving access to the internal space, and at least one slot opening between the two opposing cutouts, wherein the frame includes a front end and a rear end having axially aligned apertures, one of which is configured to receive the first threaded shaft, the internal space of the frame is sized to retain a portion of the first threaded shaft and the first locking nut therein; and
   a cover removably secured to the frame, the cover including a pair of opposing side walls extending from a top wall, the top wall including an interior wall surface that includes an elongated member configured to protrude through the at least one slot opening of the frame and engage the first locking nut within the internal space of the frame and prevent rotational movement of the first locking nut when the cover is in a covering configuration;
   wherein the first locking nut contacts at least three contact surfaces when the cover is in the covering configuration, the at least three contact surfaces include the elongated member and the pair of opposing side walls of the cover.

2. The turnbuckle of claim 1, wherein the frame includes a mid-portion wall dividing the internal space.

3. The turnbuckle of claim 2, wherein the mid-portion wall provides support to the cover when in the covering configuration.

4. The turnbuckle of claim 1, wherein the cover is pivotably attached to one of the front end and the rear end of the frame, and movable between the covering configuration and an uncovering configuration.

5. The turnbuckle of claim 1, wherein the cover includes at least one indent configured to provide a gripping surface for gripping purposes.

6. The turnbuckle of claim 4, whereby the first locking nut is capable of rotating when the cover is in the uncovered configuration and the first locking nut is unable to rotate when the cover is in the covering configuration.

7. The turnbuckle of claim 1, wherein the cover includes at least two section covers that are removably attached to the frame.

8. The turnbuckle of claim 7, wherein each respective section cover of the two section covers is pivotably attached to a respective one of the front end and the rear end of the frame and configured to independently pivot from one another.

9. The turnbuckle of claim 1, wherein the cover includes a pair of axially aligned apertures configured to receive therethrough a locking mechanism to secure the cover in a covering configuration.

10. A turnbuckle, comprising:
    a first threaded shaft having a first locking nut;
    a frame delimiting an internal space and having at least two opposing cutouts giving access to the internal space, and at least one slot opening between the two opposing cutouts, wherein the frame includes a front end and a rear end having axially aligned apertures, one of which is configured to receive the first threaded shaft, the internal space of the frame is sized to retain a portion of the first threaded shaft and the first locking nut therein; and
    a cover pivotably attached to one of the front end and the rear end of the frame, the cover including a pair of opposing side walls extending from a top wall, the top wall including an interior wall surface that includes an elongated member configured to protrude through the at least one slot opening of the frame and engage the first locking nut within the internal space of the frame,
    wherein the cover is movable between a covering configuration and an uncovering configuration, and
    wherein the first locking nut contacts at least three contact surfaces when the cover is in the covering configuration, the at least three contact surfaces include the elongated member and the pair of opposing side walls of the cover, preventing rotational movement of the first locking nut.

11. The turnbuckle of claim 10, wherein the frame includes a mid-portion wall dividing the internal space and configured to provide support for the cover when in the covering configuration.

12. The turnbuckle of claim 10, wherein the cover includes one or more indents configured to provide a gripping surface for gripping purposes.

13. The turnbuckle of claim 10, wherein the cover includes at least two section covers that are removably attached to the frame.

14. The turnbuckle of claim 13, wherein each respective section cover of the two section covers is pivotably attached to a respective front end or rear end of the frame and configured to independently pivot from one another.

15. The turnbuckle of claim 10, wherein the cover includes a pair of axially aligned apertures configured to receive therethrough a shackle of a locking mechanism to secure the cover in a covering configuration.

16. A turnbuckle, comprising:
    a first threaded shaft having a first locking nut;
    a second threaded shaft having a second locking nut;
    a frame delimiting an internal space,
    wherein the frame includes front and rear ends with axially aligned apertures one of which is configured to receive the first threaded shaft, the other of which is configured to receive the second threaded shaft, the internal space of the frame is sized to retain a portion of the first threaded shaft and the first locking nut and a portion of the second threaded shaft and the second locking nut therein, wherein the frame includes side ends each with a plurality of cutouts giving access to the interior space, and wherein the frame includes at least two slot openings on a top end; and a cover removably secured to the frame, the cover having a top wall with an interior wall surface that includes at least two spaced-apart elongated members protruding therefrom, opposing open ends, and opposing side walls extending from the top wall delimiting a space configured to receive the frame therein, wherein the pair of elongated members are configured to protrude through a corresponding slot opening of the frame and engage a respective one of the first locking nut and the second locking nut through at least three contact surfaces, the at least three contact surfaces include the elongated members and the pair of opposing side walls of the cover, preventing rotational movement of the first locking nut and the second locking nut when the cover is in a covering configuration.

* * * * *